Figure 1:
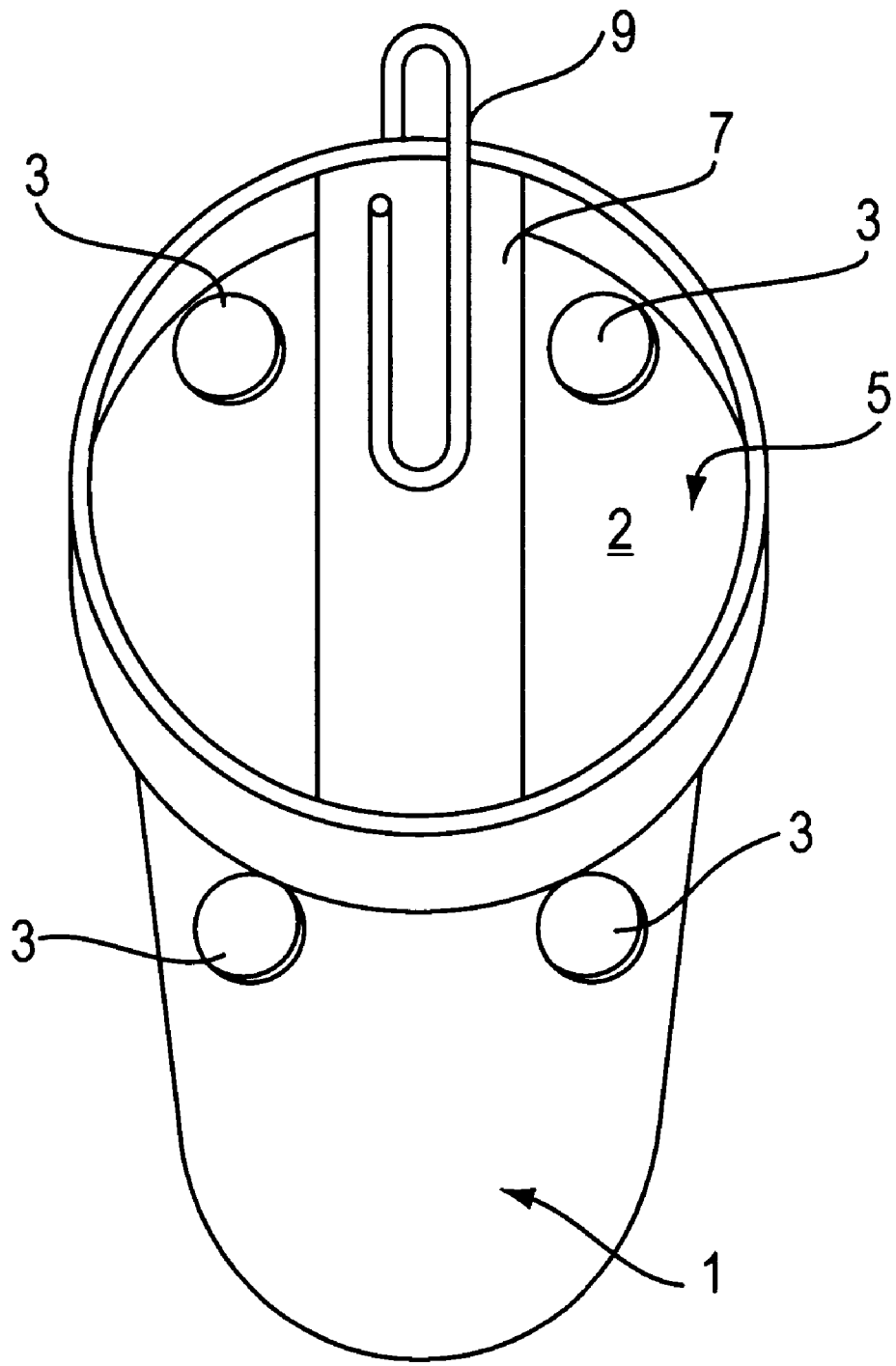

United States Patent [19]
Perich et al.

[11] Patent Number: 5,983,557
[45] Date of Patent: Nov. 16, 1999

[54] LETHAL MOSQUITO BREEDING CONTAINER

[75] Inventors: Michael J. Perich, Frederick; Brian C. Zeichner, Forest Hill, both of Md.

[73] Assignee: The United States of America as represented by the Secretary of the Army, Washington, D.C.

[21] Appl. No.: 08/965,518

[22] Filed: Nov. 6, 1997

[51] Int. Cl.$^6$ .............. A01M 1/20; A01M 1/02
[52] U.S. Cl. .............. 43/107; 43/131; 43/132.1
[58] Field of Search .............. 43/107, 124, 131, 43/132.1; 119/6.5, 6.6, 6.7

[56] References Cited

U.S. PATENT DOCUMENTS

| | | | |
|---|---|---|---|
| 794,637 | 7/1905 | Park et al. | 43/131 |
| 1,577,351 | 3/1926 | Alvarez | 43/131 |
| 1,714,666 | 5/1929 | Gring | 43/131 |
| 1,831,476 | 11/1931 | Bennett | 43/124 |
| 1,936,644 | 11/1933 | Schroder | 43/121 |
| 1,974,549 | 9/1934 | Spencer et al. | 119/6.5 |
| 2,109,642 | 3/1938 | Hunt | 43/124 |
| 2,254,948 | 9/1941 | Kubalek | 43/131 |
| 2,539,633 | 1/1951 | Morrill | 119/6.5 |
| 2,573,672 | 10/1951 | Reinhardt | 43/131 |
| 2,970,565 | 2/1961 | Reynolds | 119/6.5 |
| 3,224,145 | 12/1965 | Ballard | 43/131 |
| 3,643,371 | 2/1972 | Gordon | 43/131 |
| 3,997,999 | 12/1976 | Evans | 43/107 |
| 4,002,146 | 1/1977 | Neff | 119/51.04 |
| 4,019,459 | 4/1977 | Neff | 119/223 |
| 4,103,450 | 8/1978 | Whitcomb | 43/131 |
| 4,218,843 | 8/1980 | Clarke, Jr. | 43/131 |
| 4,228,614 | 10/1980 | Cardarelli | 43/131 |
| 4,310,985 | 1/1982 | Foster et al. | 43/131 |
| 4,328,636 | 5/1982 | Johnson | 43/107 |
| 4,563,344 | 1/1986 | Kotz et al. | 43/132.1 |

(List continued on next page.)

FOREIGN PATENT DOCUMENTS

| | | | |
|---|---|---|---|
| 403206836 | 9/1991 | Japan | 43/107 |
| 404179426 | 6/1992 | Japan | 43/107 |
| 2011343 | 4/1994 | U.S.S.R. | 43/107 |
| 2080686 | 2/1982 | United Kingdom | 43/124 |

OTHER PUBLICATIONS

Obaldia, "*Aedes aegypti* resting preference on untreated and deltamethrin–treated crepe paper and plastic foam surfaces," J. of the Amer. Mosquito Control Assc., Mosquito Vector Symposium, vol. 12, No. 3, pp. 467–468 (Sep. 1996).

Ikeshoji, "Surfactants for a mosquito trap," Jap. J. Sanit. Zool., vol. 28, No. 4, pp. 451–452 (1977).

Lok, "An autocidal ovitrap for the control and possible eradication of *Aedes aegypti*," Southeast Asian J. Trop. Med. Pub. Hlth., vol. 8, No. 1, pp. 56–62 (Mar. 1977).

*Primary Examiner*—Michael J. Carone
*Assistant Examiner*—Darren Ark
*Attorney, Agent, or Firm*—Charles H. Harris; John Francis Moran

[57] ABSTRACT

Provided is a breeding container which is adapted to be lethal to container breeding mosquitoes which contains:

- a walled structure defining an internal volume, the walled structure being constructed and arranged to contain an aqueous liquid within at least a portion of the internal volume;
- at least one opening in the walled structure disposed so as to allow mosquitoes to enter the walled structure;
- mosquito egg laying structure in the internal volume constructed and arranged such that female mosquitoes contact a surface of the mosquito egg laying structure; and
- an insecticide that is lethal to mosquitoes present in an amount sufficient to kill the female mosquitoes in contact with the surface. Also provided is a lethal mosquito breeding container kit and a method for controlling the population of container breeding mosquitoes.

35 Claims, 5 Drawing Sheets

U.S. PATENT DOCUMENTS

| | | | |
|---|---|---|---|
| 4,631,857 | 12/1986 | Kase et al. | 43/132.1 |
| 4,662,103 | 5/1987 | Cheng | 43/131 |
| 4,794,724 | 1/1989 | Peters | 43/107 |
| 4,804,142 | 2/1989 | Riley | 43/131 |
| 4,908,977 | 3/1990 | Foster | 43/107 |
| 4,932,155 | 6/1990 | Friemel et al. | 43/131 |
| 5,123,201 | 6/1992 | Reiter | 43/107 |
| 5,359,808 | 11/1994 | Fitsakis | 43/132.1 |
| 5,731,055 | 3/1998 | Bernardo | 43/131 |
| 5,749,168 | 5/1998 | Chrysanthis | 43/131 |
| 5,771,628 | 6/1998 | Nobbs | 43/132.1 |
| 5,819,685 | 10/1998 | Kappelt et al. | 119/6.5 |

५,९८३,५५७

LETHAL MOSQUITO BREEDING CONTAINER

FIELD OF THE INVENTION

The present invention relates to a breeding container which is lethal to container breeding mosquitoes. The present invention also relates to an environmentally sound, simple, cost-effective method for controlling the population of Aedes species of mosquito, primarily *Aedes aegypti* and *Aedes albopictus*.

BACKGROUND OF THE INVENTION

With approximately 20 million dengue cases a year and 100 countries affected, the World Health Organization considers dengue the most important mosquito-borne viral disease. A vaccine is not currently available and mosquito control is a critical element of dengue disease prevention. There are reports that conventional ground and aerial application of insecticides are not providing adequate control of the mosquitoes that transmit dengue. Dengue is primarily transmitted by the Aedes species of mosquito. The Aedes mosquito is a container breeder and, therefore, the female Aedes mosquito will only lay eggs in a container holding water.

Chemical mosquito control has relied on area treatment of the mosquitoes' habitat. For example, large outdoor areas or the space within a home are treated with an insecticidal fog or spray in an attempt to deposit a lethal dose of insecticide on individual mosquitoes. The water used as mosquito breeding habitats has also been treated with insecticide which is designed to kill the developing larva. Adult resting places have been treated with an insecticide deposit designed to kill adult mosquitoes as they stand on the resting places.

The oviposition trap (hereinafter "ovitrap")has been used as a surveillance tool for Aedes mosquitoes. The ovitrap consists of a pint sized water container, filled with water to within 1 inch of the top, with a wooden or velour paper paddle projecting above the water surface. Aedes females are attracted to the ovitrap and deposit eggs on the paddle. The number of eggs deposited provides an indication of the Aedes mosquito population.

A variation of the ovitrap in described in U.S. Pat. No. 5,123,201. This patent describes a sensor-triggered suction trap for collecting live gravid mosquitoes. When a mosquito interrupts an infrared beam a fan is activated which blows the mosquito into a container for collection. Such a device is complicated and expensive. Furthermore, this device does not kill mosquitoes or mosquito larvae.

Chan, K. L., et. al., "An autocidal ovitrap for the control and possible eradication of *Aedes aegypti*", Southeast Asian Journal of Tropical Medicine and Public Health, 8(1), pages 56–62 (1977), discloses a modified ovitrap in which any eggs that hatched would be unable to emerge as adults because of a mechanical barrier. By slowly trapping and killing progeny of *Aedes aegypti* there was a gradual reduction of the population.

U.S. Pat. No. 4,328,636 describes a foraminous barrier which prevents hatched mosquitoes from escaping a body of water. Such a trap, which allows adult females to escape, does not directly interrupt the dengue transmission cycle since adult females can leave the trap after depositing their eggs and take another blood meal, possibly transmitting dengue.

Ikeshoji, T., et. al., "Surfactants for a mosquito ovitrap", Jap. J. Sanit. Zool., 28(4), pages 451–452 (1977), relates to the use of surfactants to drown adult mosquitoes as they attempted to lay eggs. This method is a research tool and not a control method.

Obaldia, G. Davila de, et. al., "*Aedes aegyti* resting preference on untreated and deltamethrin-treated crepe paper and plastic foam surfaces", J. Am. Mosq. Control Assoc. 12(3), pages 467–68 (1996), investigated the use of resting boxes having insecticide impregnated surfaces. Shortcomings of such a control method are that there are many resting stations to compete with and females would be able to lay eggs prior to entering the resting box, ensuring a next generation.

There is a need for an environmentally sound, simple, cost-effective apparatus and method for controlling populations of the Aedes species of mosquito, primarily *Aedes aegypti* and *Aedes albopictus*.

SUMMARY OF THE INVENTION

An objective of the present invention is to provide an environmentally sound, simple, cost-effective apparatus and method for controlling the population of container breeding mosquitoes, such as the Aedes species of mosquito.

The above objective and other objectives are surprisingly obtained by the following. The present invention provides a novel breeding container which is adapted to be lethal to container breeding mosquitoes comprising:

a walled structure defining an internal volume, the walled structure being constructed and arranged to contain an aqueous liquid within at least a portion of the internal volume;

at least one opening in the walled structure disposed so as to allow mosquitoes to enter the walled structure;

mosquito egg laying structure in the internal volume constructed and arranged such that female mosquitoes contact a surface of the mosquito egg laying structure; and an insecticide that is lethal to mosquitoes present in an amount sufficient to kill the female mosquitoes in contact with the surface.

The present invention also provides a novel kit for making the breeding container.

The present invention further provides a novel method of controlling the population of container breeding mosquitoes.

The novel lethal mosquito breeding container and method according to the present invention provide the following advantages over conventional methods of controlling the population of container breeding mosquitoes. By killing adult female container breeding mosquitoes according to the present invention, the population of biting mosquitoes is substantially reduced, thus reducing both the potential for disease transmission and the breeding stock for the next generation. This approach is superior to simply trapping and removing eggs laid by female container breeding mosquitoes, which may then go on to lay additional eggs in a natural site which allows complete development of the larvae to adults.

Since a portion of the insecticide can leach into the water, any mosquito larvae which hatch may not survive because the water can be toxic to mosquito larvae. Furthermore, any mosquito adults drinking from the insecticide contaminated water may also perish. In this way, mosquitos which may bypass the insecticide treated egg laying structure can be killed. In caged laboratory tests, up to 100 percent adult mosquito mortality has occurred.

The lethal breeding containers can easily be made child safe because a very small quantity of insecticide is required.

For example, a 20 pound child can consume ten egg laying structures containing the insecticide and drink the insecticide contaminated water of ten 1 pint lethal breeding containers per day without any effects when using deltamethrin as the insecticide.

The lethal breeding containers can be made environmentally sound; because the amount of insecticide required is low, the mortality rate of mammals is very low and the threat of contamination to ground water or soil is also very low.

The lethal mosquito breeding container can be made simple such that community-based control programs can be used to maintain them. In some cases, the only action required will be to periodically replace the insecticide treated egg laying structure, and to add water when evaporation is significant. In this manner, the manufacturing and maintenance cost of very large numbers of the lethal mosquito breeding containers can be made very low because the raw material cost of the insecticide and container is very low.

BRIEF DESCRIPTION OF THE DRAWINGS

FIG. 1 illustrates a lethal breeding container according to the present invention.

FIG. 2 illustrates a lethal breeding container according to the present invention.

FIG. 3 illustrates a lethal breeding containing according to the present invention having an integrally formed egg laying structure.

FIG. 4 illustrates a wrapped paddle for use in a kit according to the present invention.

FIG. 5 illustrates a removable film covering the egg laying structure.

DETAILED DESCRIPTION OF PREFERRED EMBODIMENTS

The lethal mosquito breeding container comprises at least one wall having a shape that defines an internal volume for containing an aqueous liquid. Examples of suitable walled shapes include that of cartons, bottles, bowls, buckets, cans, cups, pots, pans, trays, and the like.

The wall(s) of the lethal mosquito breeding container can be formed from any material which is capable of containing an aqueous liquid. Examples of suitable materials include clay, composites, glass, metal, paper, plastic, wood, combinations thereof, and the like. The preferred material is plastic, based on the low manufacturing cost and high durability of plastic in the environment.

The container should have an internal volume large enough to contain an amount of aqueous liquid that is suitable for female container breeding mosquitoes to lay eggs in. Examples of suitable internal volumes are from about four ounces to about one gallon, preferably, about eight ounces to about one half gallon.

The desired walled container shape can be formed using any suitable method, such as gluing, heat sealing, milling, molding, press forming, or any method which provides a seal which is capable of containing an aqueous liquid.

If desired, the lethal mosquito breeding container can be formed by modifying any suitable container that is capable of containing an aqueous liquid. Examples of suitable containers include cartons, bottles, bowls, buckets, cans, cups, pots, pans, trays, and the like. Specific examples, include plastic and paper milk cartons, drinking cups, soft-drink bottles, sport drink containers, metal cans, and other mass-marketed consumer liquid container products. Preferably, the lethal mosquito breeding container is formed from a drinking cup, and more preferably from a plastic drinking cup.

Preferably, the wall(s) of the mosquito breeding container have a color which is attractive to female container breeding mosquitoes. Examples of female container breeding mosquito attracting colors are dark colors, such as black, dark browns, dark blues, dark greens and dark reds. The preferred color is black.

Preferably, most or substantially all of the mosquito breeding container wall(s) surface has a surface texture which is undesirable for landing on by female container breeding mosquitoes, so that female container breeding mosquitoes prefer to land on an egg laying structure contained therein. A preferred wall surface texture is a smooth plastic surface.

The wall(s) of the container are formed to contain at least one entrance opening in an upper portion of the container to allow mosquitoes to contact the egg laying structure or aqueous liquid contained within the walled structure. Examples of suitable entrance openings include from about 0.5 inch and greater average diameters, preferably from about 1 inch to about 6 inches average diameter. Any shape of the entrance opening can be used.

While not required, preferably the walled structure has at least one liquid regulating opening for regulating the maximum level of aqueous liquid present in the internal volume. The liquid regulating opening should be disposed such that a portion of the internal volume above the liquid regulating opening remains dry. For example, the liquid regulating opening can be a hole formed in the wall or can be a notch or slit formed in the wall. The notch or slit can be formed from the entrance opening of the container down to a desired maximum liquid level in the internal volume. The required number and size of the liquid regulating opening(s) will depend on the size of the internal volume. In general, the greater the internal volume, the greater the number and/or size of the liquid regulating opening(s). For a 4.5 inch tall 1 pint plastic drinking cup utilized as the walled structure, a suitable number of liquid regulating holes has been found to be about 4, each having a diameter of about 0.4 inch, and being located about 1 inch from the top.

The liquid regulating opening(s) also provides the function of making the lethal mosquito breeding container unsuitable for use by humans as a drinking cup or other type of container. In developing countries, containers could be scavenged by humans for use as drinking cups and other personal uses. The presence of the liquid regulating opening makes the lethal mosquito breeding container less desirable to humans for personal use and thus ensures a prolonged mosquito killing performance in the field.

The walled structure contains at least one egg laying structure therein. The egg laying structure should be constructed and arranged such that at least a portion of the egg laying structure remains above the maximum liquid level in the internal volume. Preferably, the egg laying structure is constructed and arranged such that a portion of the egg laying structure is below the maximum liquid level in the internal volume and a portion of the egg laying structure is above the maximum liquid level. The egg laying structure is preferably in the shape of a strip or paddle.

The egg laying structure should have a surface texture which is suitable for female container breeding mosquitoes to lay eggs on. Examples of such surface textures are rough paper surfaces, such as velour paper.

The egg laying structure can be formed from any material which is durable in an aqueous medium. Preferably, the material selected should substantially retain its integrity in an aqueous medium for at least about 1 week, preferably at least about 1 month. If insecticide is applied directly to the egg laying material, the egg laying material selected should be compatible with the insecticide such that the insecticide is easily transferred to container breeding mosquitoes when they land on the egg laying structure.

Figure 4:
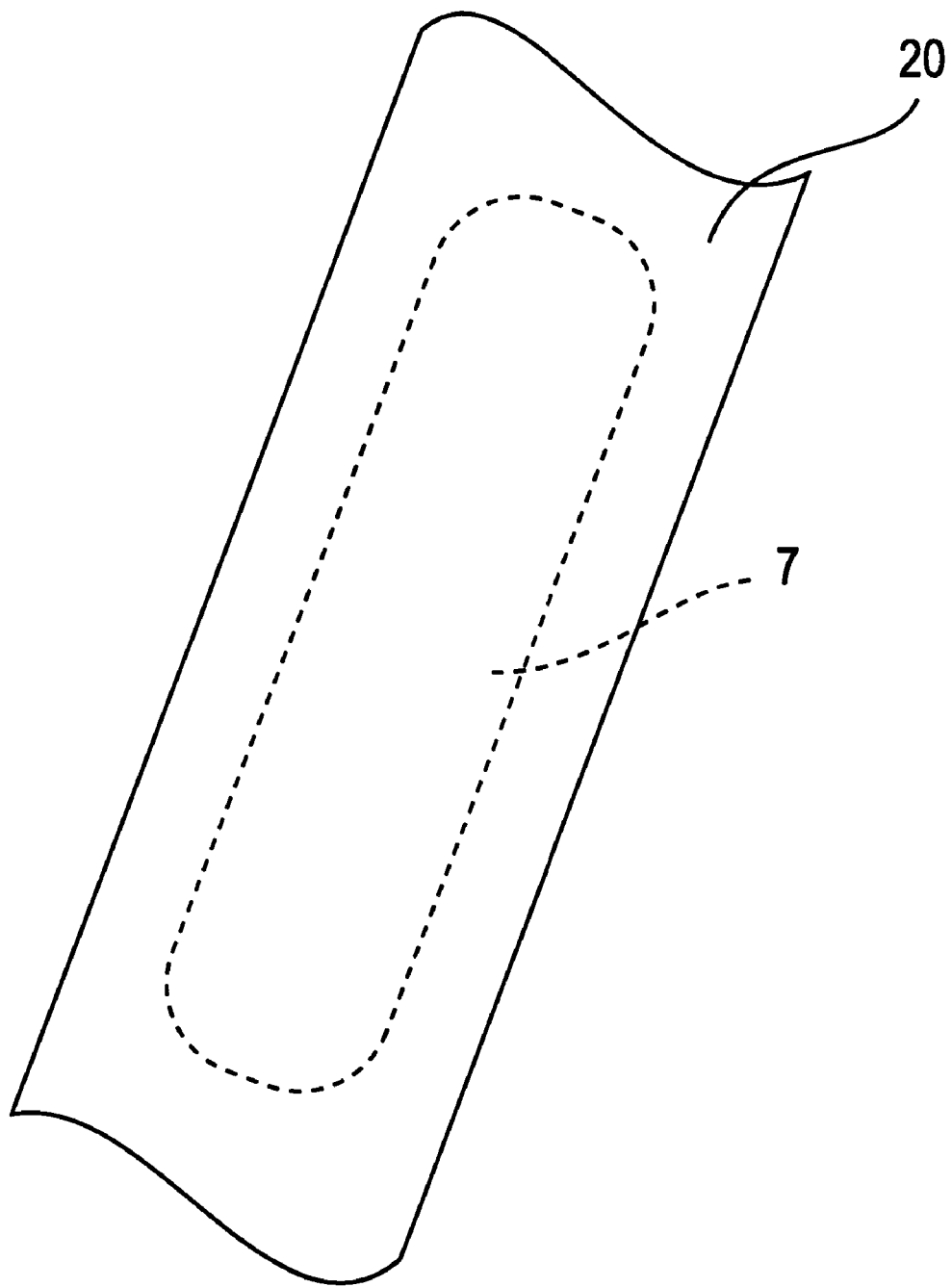
Figure 5:
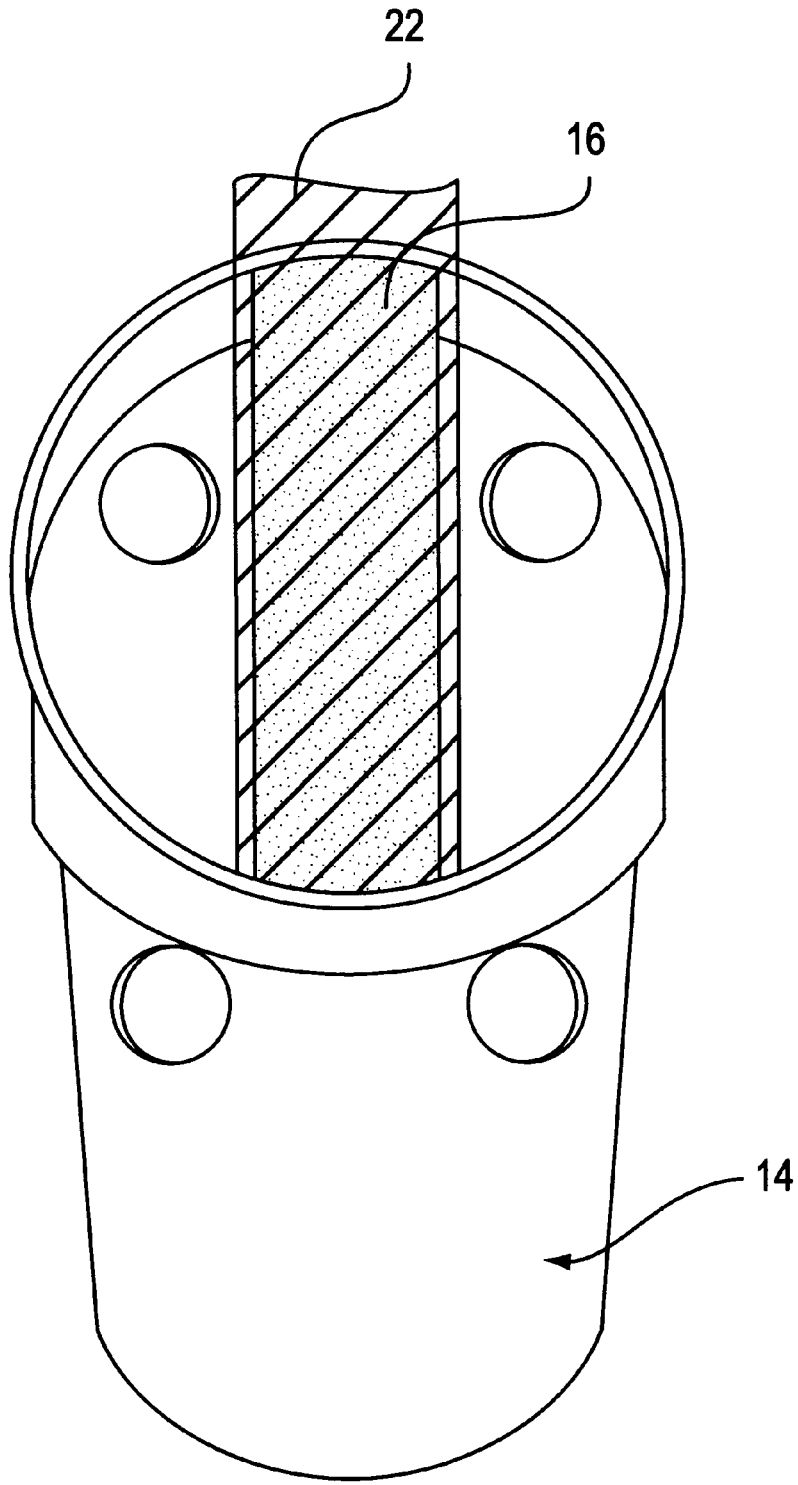

If the insecticide is applied to an inside surface of the lethal mosquito breeding container or is added to the aqueous liquid, the egg laying structure should be formed of a material that is capable of wicking or absorbing the insecticide from the aqueous medium so that a surface of the egg laying structure becomes lethal to female container breeding mosquitoes landing on the surface.

The egg laying structure can be made from synthetic or natural materials. Specific examples of suitable egg laying structure materials include paper, textured plastic, cloth, cotton, and wood. A preferred egg laying structure material is cotton flocking.

The egg laying structure can rest unbound or be fastened to a wall of the lethal mosquito breeding container. Preferably, the egg laying structure is fastened using any suitable means, such as adhesives, clips, staples, and the like. To facilitate replacement of the egg laying structure, the egg laying structure is preferably fastened using a clip, such as a paper clip. While not preferred, the egg laying structure can be integrally formed in a wall of the lethal mosquito breeding container. For example, as shown in FIG. 3 paper can be used as the wall material 14. The paper can be made to have a smooth surface for most of the wall, and a lesser portion of the paper can be made to have a rough surface 16 which is suitable for egg laying by female container breeding mosquitoes. The insecticide can be absorbed into the portion of the paper wall having a rough surface.

The egg laying structure can be made suitable as a place for mosquitoes to land for drinking the aqueous liquid. In this manner, mosquitoes can be killed by both drinking the water and by contacting a surface of the egg laying structure.

The lethal mosquito breeding container comprises at least one insecticide in an amount suitable for killing female container breeding mosquitoes that land on the egg laying structure. The insecticide can be applied directly to the egg laying structure or to a surface in the internal volume which will contact the aqueous liquid contained therein during use. Preferably, the insecticide is applied directly to the egg laying structure. If the insecticide is applied to a surface in the internal volume which will contact the aqueous medium, the egg laying structure material and insecticide should be selected such that the insecticide absorbs into or onto a surface of the egg laying structure from the aqueous medium in an amount that can kill female container breeding mosquitoes when they land on the egg laying structure. Based on the disclosure provided herein, one skilled in the art will easily be able to determine the amount and type of insecticide and egg laying structure material to provide an egg laying structure which is lethal to female container breeding mosquitoes when they contact the egg laying structure. Preferably, the insecticide is present in an amount that can kill container breeding mosquito larvae present in the aqueous medium.

Any insecticide suitable for killing container breeding mosquitoes can be utilized. Examples of preferred insecticides include carbamates and pyrethroids as the active ingredient. More preferably, the insecticide comprises a pyrethroid. Examples of preferred pyrethroids include deltamethrin, cyfluthrin, cypermethrin, and lambda-cyhalothrin. Deltamethrin has been found to be the most preferred active ingredient for use in the insecticide. While not preferred, an acutely toxic insecticide can be utilized, such as methyl parathion. Suitable amounts of pyrethroids have been found to be from about 0.1 to about 10 mg, preferably about 0.5 to about 1 mg, per 1 inch by 4⅜ inch velour paper paddle, for a lethal mosquito breeding container having an internal volume of about 1 pint. In general, the amount of insecticide necessary to kill container breeding females will depend on the size of lethal mosquito breeding container, the type of insecticide utilized, and where the insecticide is placed in the lethal mosquito breeding container. Based on the disclosure provided herein, one skilled in the art will easily be able to determine an amount of the selected insecticide that is suitable for killing container breeding females in the desired lethal breeding container. The insecticide can be formulated in any suitable manner, such as from emulsifiable concentrates, wettable powders, and micro-encapsulations.

Since the lethal mosquito breeding container is designed to be utilized close to human populations, preferably the amount of insecticide is at or below the environmentally safe amount for the selected insecticide as defined by the U.S. Environmental Protection Agency. If there is no U.S. government standard for the insecticide selected, preferably, the amount of insecticide utilized is not toxic to children. Remarkably, it has been found when about 1 mg of deltamethrin is utilized on an egg laying structure in a lethal mosquito breeding container having an internal volume of about 1 pint, 10 egg laying structures along with 10 pints of the insecticide contaminated water can be consumed per day by a 20 pound child without having any effect.

The lethal mosquito breeding container has the advantage of being substantially self sustaining without significant human effort. For example, once an aqueous liquid, such as water, is initially added to the lethal mosquito breeding container during setup in the field, the level of liquid in the lethal mosquito breeding container can be maintained by rain water flowing into the entrance opening if it is facing substantially skyward and the container is outside in the field. If the lethal mosquito breeding container is used indoors or under a covering, the liquid level may have to be maintained by human effort. Furthermore, it has been found that some insecticides can remain effective for periods of at least about 1 month in the field, even at the low level of 1 mg per 1 pint of aqueous liquid. In particular, paper paddles treated with deltramethrin and returned to the lab after one month in the field still exhibited an average mortality of 80% in caged tests. Thus, when using deltamethrin, the insecticide need only be renewed on a monthly basis. For example, the insecticide can be renewed monthly by simply adding a new egg laying structure containing insecticide to the lethal mosquito breeding container, or by applying a dose of insecticide to the aqueous liquid or egg laying structure present in the lethal mosquito breeding container.

If desired, a female container breeding mosquito attractant can be added to the lethal mosquito breeding containerto further enhance the ability of the lethal mosquito breeding container to attract female container breeding mosquitoes. For example, chemical attractants, such as pheromones, can be added to the egg laying structure and/or applied to the aqueous liquid in the lethal mosquito breeding container. Other types of attractants can also be used, such as hay infusion, which can be added directly to the aqueous medium. Hay infusion comprises hay which has been soaked in water for an extended period of time.

The lethal mosquito breeding container can be mass produced in the form of a kit. A preferred form of the kit comprises a walled structure as described herein, an egg laying structure 7 having an insecticide which is contained in a removable sealed package 20 as shown in FIG. 4, and a fastening structure for fastening the egg laying structure to the walled structure. The egg laying structure can be packaged in any packaging material which is suitable for containing the selected insecticide. Packing materials are well known in the art and one skilled in the art will be able to easily select a suitable packaging material. Alternatively, the egg laying structure can be fastened to the walled structure or be integrally formed in the walled structure and the packaging material can be a removable film 22, adhered to the walled structure and covering the egg laying structure, as shown in FIG. 5. The kit also can include a female container breeding mosquito attractant, as described herein.

The present invention will now be explained in detail with reference to the attached drawings. FIG. 1 illustrates a preferred lethal mosquito breeding container according to the present invention. A modified 4.5 inch tall 1 pint plastic cup defining a walled structure having an internal volume 2 is shown generally at 1. Four liquid regulating holes, shown at 3, are formed in the cup, each at a distance of about 1 inch from the entrance opening 5 in the cup. The liquid regulating holes 3 have a diameter of about 0.4 inch. The liquid regulating holes provide the function of regulating the amount of liquid present in the cup. As rain or other sources of liquid fill the cup, excess liquid drains out of the cup through the liquid regulating holes 3. The liquid regulating holes 3 also serve the purpose of making the cup less desirable to humans. In developing countries, cups are sometimes scavenged by humans for personal usage. The presence of the liquid regulating holes deters the use of the cups by humans. The entrance opening 5 on top of the cup is left open to allow female mosquitoes to contact the liquid present within the cup and/or the removable paddle shown at 7. The removable paddle 7 is formed of paper and contains the insecticide. The insecticide can disperse into the aqueous liquid when the insecticide treated paddle is added to the lethal mosquito breeding container. The removable paddle is secured to the cup using a paper clip, shown at 9.

Figure 2:
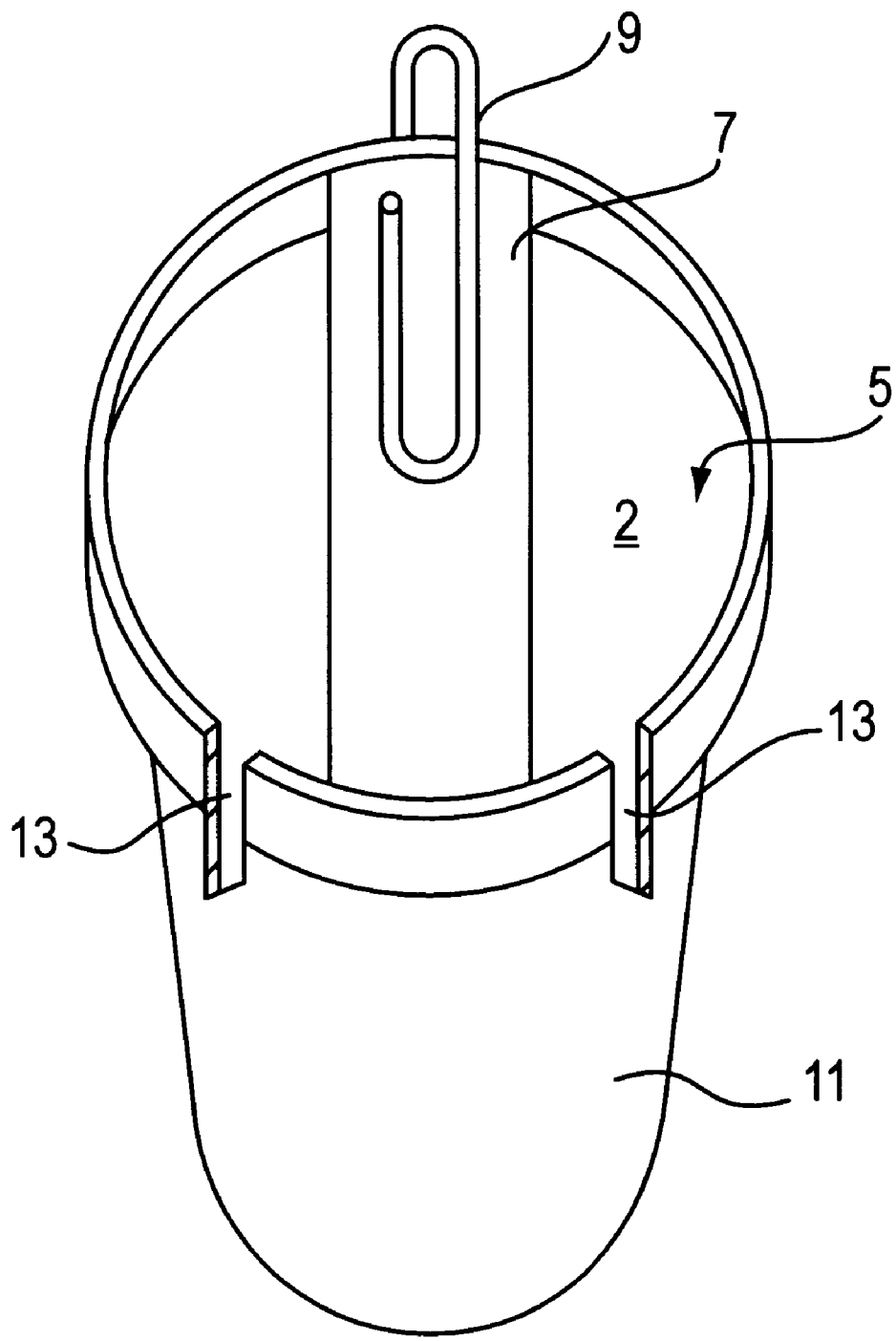
Figure 3:
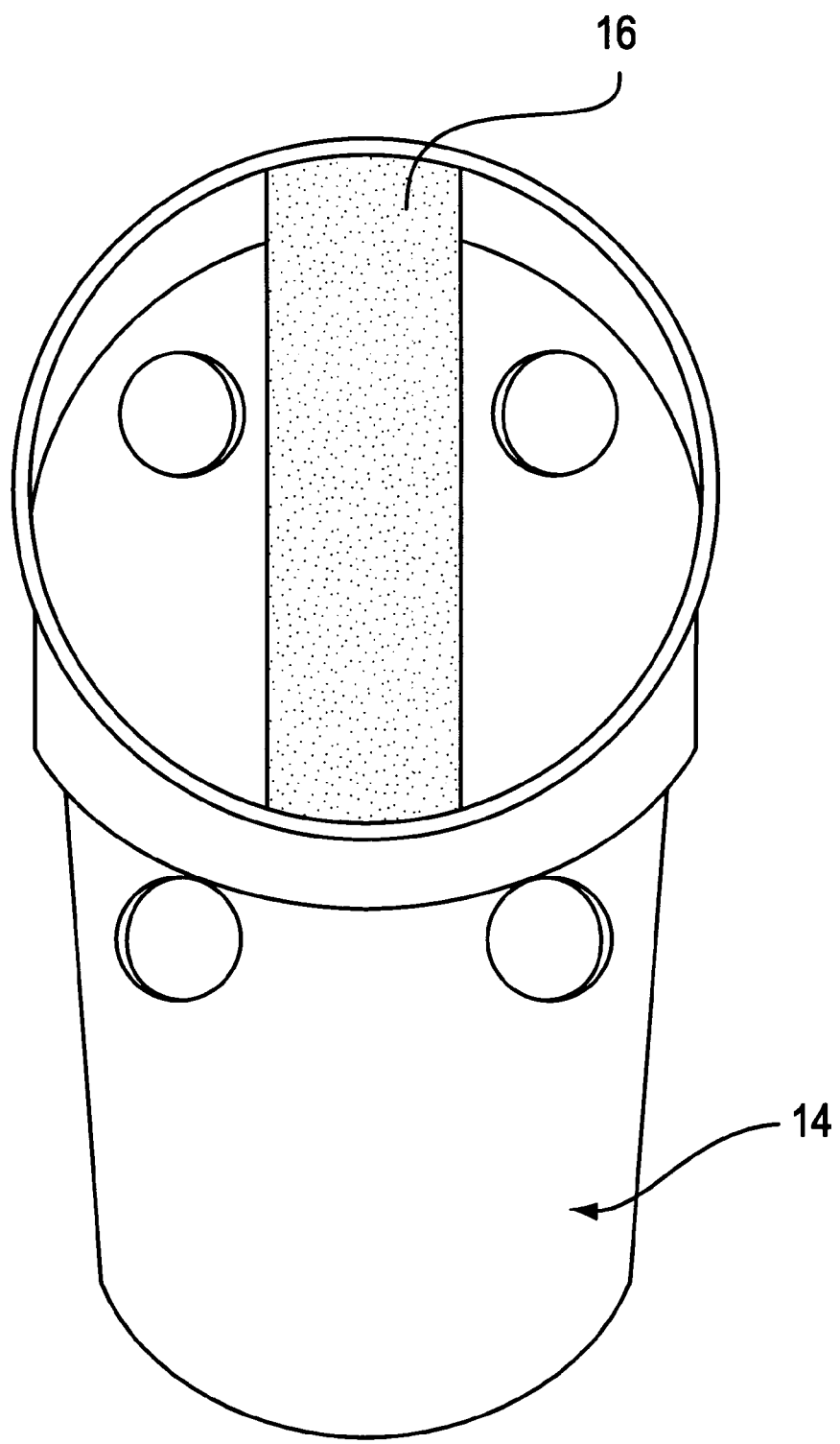

FIG. 2 illustrates another preferred lethal mosquito breeding container according to the present invention. A modified 4.5 inch tall 1 pint plastic cup defining a walled structure having an internal volume 2 is shown generally at 11. Liquid regulating notches, shown at 13, are formed in the cup. The liquid regulating notches are about 1 inch in length and about 0.25 inch wide. The liquid regulating notches provide the function of regulating the amount of liquid present in the cup. As rain or other sources of liquid fill the cup, excess liquid drains out the cup through the liquid regulating notches 13. The liquid regulating notches 13 also serve the purpose of making the cup less desirable to humans. Similar to the liquid regulating holes 3, the presence of the liquid regulating notches 13 deters the use of the cups by humans. The entrance opening, shown at 5, on top of the cup is left open to allow female mosquitoes to contact the liquid present within the cup and/or the removable paddle shown at 7. The removable paddle is formed of paper and contains the insecticide. The insecticide can disperse into the aqueous liquid when added to the lethal mosquito breeding container. The removable paddle is secured to the cup using a paper clip, shown at 9.

The present invention will now be further explained by way of the following examples, without being limited thereto.

EXAMPLES 1–10 AND CONTROL EXAMPLES A–C

Mosquito breeding containers were first formed. Black plastic 4.5 inch tall 1 pint drinking cups were modified according to the present invention by forming four 0.4 inch holes located about 1 inch from the top, as shown in FIG. 1. The egg laying structures were formed as follows. Commercially available red velour paper, Bienfang NO 4000, was cut into strips of 1 inch by 4⅜ inches. The strips were treated with the appropriate insecticide and allowed to dry completely. One egg laying structure (strip) was fastened in each cup using a paper clip, as shown in FIG. 1.

The efficacy of lethal mosquito breeding containers having different types of insecticides was tested and compared to control mosquito breeding containers containing no insecticide, as follows. For each example, the amount of active ingredient and type of insecticide shown in Table 1 was added to the egg laying structure of each lethal breeding container. No insecticide was added to the egg laying structures of the control mosquito breeding containers.

Some of the examples and control examples contained a mosquito attractant, hay infusion.

The corrected mortality rate of female container breeding mosquitoes, in particular *Aedes Aegypti*, was determined and the results are shown in Table 1.

TABLE 1

| Components | Cont Ex. A | Cont. Ex. B | Cont. Ex. C | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|---|---|
| Deltamethrin (mg) | 0 | 0 | 0 | 0.165 | 0.87 | 0 | 0 | 0 | 0 | 0 | 0 | 0 | 0 |
| Cypermethrin (mg) | 0 | 0 | 0 | 0 | 0 | 0.2 | 0.2 | 2.81 | 0 | 0 | 0 | 0 | 0 |
| Cyfluthrin (mg) | 0 | 0 | 0 | 0 | 0 | 0 | 0 | 0 | 0.115 | 0.115 | 0.57 | 0 | 0 |
| Bendiocarb (mg) | 0 | 0 | 0 | 0 | 0 | 0 | 0 | 0 | 0 | 0 | 0 | 1.06 | 0 |
| Permethrin (mg) | 0 | 0 | 0 | 0 | 0 | 0 | 0 | 0 | 0 | 0 | 0 | 0 | 0.156 |
| No. Mosquitoes Exposed | 118 | 155 | 266 | 366 | 265 | 112 | 260 | 252 | 121 | 273 | 235 | 145 | 98 |
| Hay Infusion (%) | 0 | 10 | 10 | 10 | 10 | 0 | 10 | 10 | 0 | 10 | 10 | 0 | 0 |
| Test Results | | | | | | | | | | | | | |

TABLE 1-continued

| Components | Cont Ex. A | Cont. Ex. B | Cont. Ex. C | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|---|---|
| Corrected Mortality Rate (%) | 9* | 14* | 12* | 94 | 98 | 90 | 89 | 100 | 81 | 80 | 100 | 45 | 47 |

*Uncorrected Mortality Rate

The results in Table 1 clearly demonstrate that the lethal mosquito breeding containers according to the present invention are very effective at reducing the population of female container breeding mosquitoes. In some instances, a 100% mortality rate was achieved.

EXAMPLES 11–13 AND CONTROL EXAMPLE D

The long term efficacy of lethal mosquito breeding containers was tested as follows. Three lethal mosquito breeding containers were formed in a similar manner to Example 1, except containing the insecticides shown in Table 2. The mortality rate after 31 days was tested using 1 inch of water in the lethal mosquito breeding container, and compared to a control example. The test results are shown in Table 2.

TABLE 2

| Component | Control Ex. D | Example 11 | Example 12 | Example 13 |
|---|---|---|---|---|
| Deltamethrin (mg) | 0 | 0.87 | 0 | 0 |
| Cypermethrin (mg) | 0 | 0 | 2.81 | 0 |
| Cyfluthrin (mg) | 0 | 0 | 0 | 0.57 |
| No. of Mosquitoes Exposed at Day 31 | 80 | 86 | 47 | 79 |
| Test Results |  |  |  |  |
| Corrected Mortality Rate at Day 1 (%) | 14* | 92 | 87 | 60 |

*Uncorrected Mortality Rate

The test results in Table 2 demonstrate that the mortality rate can be maintained at about 60% or greater for up to 31 days.

EXAMPLE 14

A field test of a lethal breeding container according to Example 2, containing 0.87 deltramethrin on the egg laying structure, was conducted at three military housing sites in the Rio de Janeiro area of Brazil. At each housing site, six houses were selected to receive the lethal breeding containers. About 500 meters away, six houses were selected to serve as control units. Each treatment house had five lethal mosquito breeding containers placed outside the house and five lethal mosquito breeding containers placed within the house.

Prior to installing the lethal mosquito breeding containers, each house, both at the treated sites and control sites, were sampled using flashlights and battery operated aspirators to collect all mosquitoes found in the house for ten minutes. In addition, larvae/pupae were collected when found inside the house and the number recorded. Sampling continued once a week for one month to determine the effects of the lethal breeding containers on the natural *Aedes aegypti* and *Ae Albopictus* populations, which both can transmit the Denge virus.

After one month in the field, the egg laying structures from the lethal container breeding containerswere dried and shipped to the U.S. for testing. Four egg laying structures from outside lethal mosquito breeding containers and four egg laying structures from inside lethal mosquito breeding containers were reused in lethal mosquito breeding containers and the mortality rate was determined.

The four inside egg laying structures exhibited an average corrected mortality rate of 84%. The four outside egg laying structures exhibited a remarkable average corrected mortality rate of 95%.

EXAMPLES 15–17 AND CONTROL EXAMPLE E

The effects of rainfall on the efficacy of the lethal mosquito breeding container was tested. Three lethal mosquito breeding containers were formed in a similar manner to Examples 2, 5, and 8, as shown in Table 3. The lethal mosquito breeding containers were flooded with 180 ml of water, which is equivalent to about 3.2 cm of rainfall on each of six different days. The mosquitoes were exposed for 48 hours and the mortality rate was tested. The test results are shown in Table 3.

TABLE 3

| Component | Control Ex. E | Example 15 | Example 16 | Example 17 |
|---|---|---|---|---|
| Deltamethrin (mg) | 0 | 0.87 | 0 | 0 |
| Cypermethrin (mg) | 0 | 0 | 2.81 | 0 |
| Cyfluthrin (mg) | 0 | 0 | 0 | 0.57 |
| No. of Mosquitoes Exposed | 140 | 135 | 120 | 130 |
| Test Results |  |  |  |  |
| Corrected Mortality Rate (%) | 17* | 57 | 84 | 63 |

*Uncorrected Mortality Rate

The test results in Table 3 demonstrate that the mortality rate can be maintained at about 50% or greater in a wet environment.

EXAMPLE 18

The toxicity of a lethal mosquito breeding container according to Example 2 was calculated using published NOEL ("No Effect Level")data.

The NOEL for a rat over a 90 day period is 1 mg/kg/day of deltamethrin.

The NOEL for a 2 year old beagle is 1 mg/kg/day of deltamethrin.

Based on the published test data for beagles and rats, a 9 kg (about 20 pound) toddler could consume 10 lethal mosquito breeding containers, both egg laying structures and water, per day without showing any effect.

Test Method for Mortality Rate

A 1 cubic foot mosquito cage was used. The mosquitoes are given a blood meal at day 4 to 6 after post-emergence. At day 6 to 8, the mosquitoes are exposed to one the lethal mosquito breeding container according to the present invention having an insecticide applied to the egg laying structure and one control non-lethal mosquito breeding container having an untreated egg laying structure. The temperature is maintained at about 80° F. at a relative humidity of about 50%.

The mortality rate is determined by counting the number of deceased mosquitoes and live mosquitoes, adding these numbers together to arrive at the total number of mosquitoes exposed, and then dividing number of deceased mosquitoes by the total number of mosquitoes and multiplying that quotient by 100%. The mortality rate can be corrected using Abbott's formula as follows:

$$\left[\frac{(\% \text{ dead mosquitoes example}) - (\% \text{ dead mosquitoes control})}{(100\% - \% \text{ dead mosquitoes control})}\right] \times 100\%$$

Abbott's formula is described in, Abbott, "A method of computing the effectiveness of an insecticide", J. Econ. Entomol. 18, pages 265–67 (1925).

While the invention has been described in detail and with reference to specific embodiments thereof, it will be apparent to those of ordinary skill in the art that various changes and modifications can be made to the claimed invention without departing from the spirit and scope thereof.

We claim:

1. A breeding container which is adapted to be lethal to mosquitoes comprising:
    a cup having an internal volume for containing a sufficient amount of aqueous liquid to attract female container breeding mosquitoes;
    a paddle being constructed and arranged such that female mosquitoes contact a surface of said paddle and lay eggs on said paddle, wherein at least a portion of the mosquito egg laying structure is above a maximum level of liquid in said cup; and
    an insecticide that is lethal to mosquitoes present on said paddle in an amount sufficient to kill said female mosquitoes in contact with said surface.

2. A breeding container according to claim 1, wherein said paddle comprises paper.

3. A breeding container according to claim 1, further comprising a fastener for removably fastening said paddle to an inside surface of said cup.

4. A breeding container which is adapted to be lethal to container breeding mosquitoes comprising:
    a stand-alone walled structure defining an internal volume, said walled structure being constructed and arranged to contain a sufficient amount of aqueous liquid to attract female container breeding mosquitoes within at least a portion of said internal volume;
    at least one opening in said walled structure disposed so as to allow mosquitoes to enter said walled structure;
    mosquito egg laying structure comprising a removable paddle in said internal volume having a surface texture which is suitable for female container breeding mosquitoes to land on and lay eggs on and being constructed and arranged such that at least a portion of the mosquito egg laying structure is above a maximum level of liquid in said walled structure; and
    an insecticide that is lethal to mosquitoes present on said egg laying structure in an amount sufficient to kill said female mosquitoes in contact with said surface of said mosquito egg laying structure.

5. A breeding container according to claim 4, wherein said insecticide is present in said internal volume and is adapted to soak into said mosquito egg laying structure upon application of an aqueous liquid into said internal volume.

6. A breeding container according to claim 4, further comprising at least one liquid regulating opening in said walled structure disposed so as to limit the maximum level of liquid in said internal volume.

7. A breeding container according to claim 4, further comprising at least one liquid regulating notch in said walled structure disposed so as to limit the maximum level of liquid in said internal volume.

8. A breeding container according to claim 4, wherein said insecticide is lethal to mosquito larvae and is present in an amount to kill larvae when present in said internal volume.

9. A breeding container according to claim 4, wherein said insecticide comprises at least one pyrethroid.

10. A breeding container according to claim 4, wherein said insecticide comprises at least one pyrethroid selected from the group consisting of deltamethrin, cypermethrin, cyfluthrin, and lambda-cyhalothrin.

11. A breeding container according to claim 4, wherein said insecticide comprises at least one carbamate.

12. A breeding container according to claim 4, wherein said paddle comprises paper having an exposed surface which can be held onto by a mosquito or which eggs can be supported thereon.

13. A breeding container according to claim 4, wherein said mosquito egg laying structure comprises paper.

14. A breeding container according to claim 4, wherein said walled structure is formed from a material selected from the group consisting of ceramic, glass, metal, paper, plastic, or wood.

15. A breeding container according to claim 4, wherein said walled structure is formed from plastic.

16. A breeding container according to claim 4, wherein said walled structure is formed from plastic having a color which is attractive to female mosquitoes.

17. A breeding container according to claim 4, wherein said walled structure is formed from plastic which is substantially black in color.

18. A breeding container according to claim 4, wherein said walled structure comprises a cup having at least one hole or notch in a side thereof.

19. A breeding container kit which is adapted to be lethal to mosquitoes comprising:
    a stand-alone walled structure defining an internal volume, said walled structure being constructed and arranged to contain a sufficient amount of aqueous liquid to attract female container breeding mosquitoes within at least a portion of said internal volume, said walled structure having at least one opening disposed so as to allow mosquitoes to enter said walled structure;
    at least one mosquito egg laying structure comprising a removable paddle and being constructed and arranged to be at least partially disposed within said internal volume such that female mosquitoes contact a surface of said mosquito egg laying structure and lay eggs thereon, wherein said egg laying structure is constructed such that at least a portion of the mosquito egg laying structure is above a maximum level of liquid in said walled structure; and
    an insecticide that is lethal to mosquitoes in an amount sufficient to kill said female mosquitoes in contact with said surface present on said egg laying structure, wherein said egg laying structure containing said insecticide being contained within a sealed package.

20. A kit according to claim 19, further comprising a fastening structure for fastening said at least one mosquito egg laying structure to said walled structure.

21. A kit according to claim 20, wherein said fastening structure comprises a paper clip.

22. A kit according to claim 19, further comprising at least one liquid regulating opening in said walled structure disposed so as to limit the maximum level of liquid in said internal volume.

23. A kit according to claim 19, further comprising at least one liquid regulating notch in said walled structure disposed so as to limit the maximum level of liquid in said internal volume.

24. A kit according to claim 19, wherein said insecticide is lethal to mosquito larvae and is present in an amount to kill larvae when present in said internal volume.

25. A kit according to claim 19, wherein said insecticide comprises at least one pyrethroid.

26. A kit according to claim 19, wherein said insecticide comprises at least one pyrethroid selected from the group consisting of deltamethrin, cypermethrin, cyfluthrin, and lambda-cyhalothrin.

27. A kit according to claim 19, wherein said insecticide comprises at least one carbamate.

28. A kit according to claim 19, wherein said paddle comprises paper having an exposed surface which can be held onto by a mosquito or which eggs can be supported thereon.

29. A kit according to claim 19, wherein said at least one mosquito egg laying structure comprises paper.

30. A kit according to claim 19, wherein said walled structure is formed from a material selected from the group consisting of ceramic, glass, metal, paper, plastic, or wood.

31. A kit according to claim 19, wherein said walled structure is formed from plastic.

32. A kit according to claim 19, wherein said walled structure is formed from plastic having a color which is attractive to female mosquitoes.

33. A kit according to claim 19, wherein said walled structure is formed from plastic which is substantially black in color.

34. A kit according to claim 19, wherein said walled structure comprises a cup having at least one liquid regulating hole or notch in a side thereof.

35. A kit according to claim 19, further comprising an attractant for a female container breeding mosquito.

* * * * *